Dec. 12, 1967  B. M. EDWARDS  3,357,031
CAMPING AND BOATING OUTFIT
Filed June 15, 1966
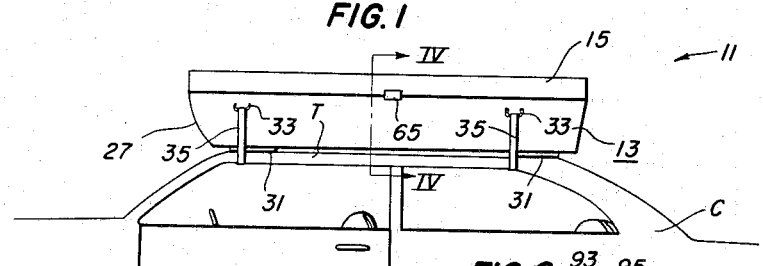
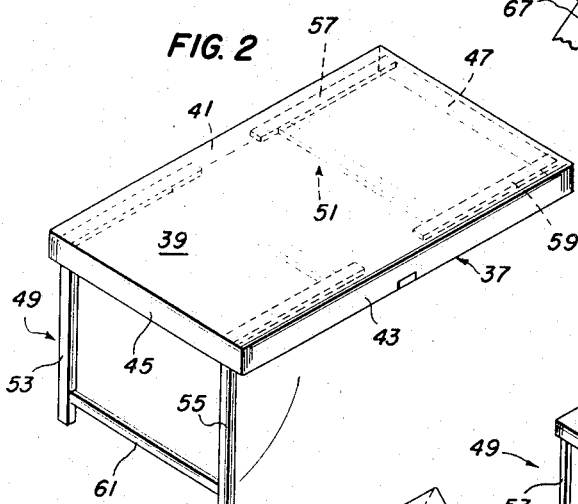
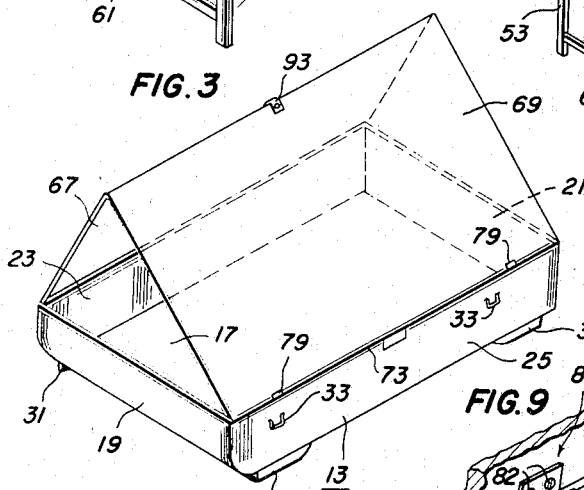
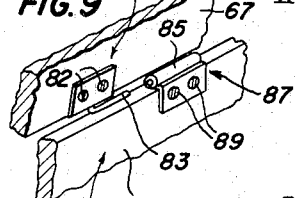
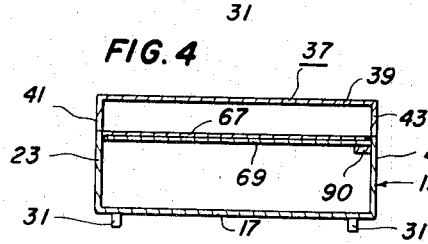
INVENTOR.
BILLY M. EDWARDS
BY John R. Walker, III
Attorney

United States Patent Office 3,357,031
Patented Dec. 12, 1967

3,357,031
CAMPING AND BOATING OUTFIT
Billy M. Edwards, 2000 St. Elmo Ave.,
Memphis, Tenn. 38127
Filed June 15, 1966, Ser. No. 557,836
7 Claims. (Cl. 9—1)

ABSTRACT OF THE DISCLOSURE

A camping and boating outfit convertible for use as a sleeper, a shelter, a table, or a boat. The camping and boating outfit includes a base that is watertight to provide selectively floating hull means when used for boating, and floor and wall means when used for camping. Also, said outfit includes an upper member having leg portions so that the device is selectively useful as a table or as a roof for the base. In addition, said outfit includes a pair of cover panels for movement between a stored disposition and a raised disposition whereby an angular cover for the base is provided.

---

This invention relates to a camping and boating outfit, which is particularly adapted to be transported by a vehicle, as on the top thereof or on a trailer pulled by the vehicle.

One of the objects of the present invention is to provide a very versatile outfit that is convertible for use as a sleeper, a shelter, a table, or a boat.

A further object is to provide such a camping and boating outfit that is adapted to be arranged in a compact disposition for transporting on the top of a vehicle or on a trailer pulled by the vehicle.

A further object is to provide such a camping and boating outfit that includes a base that is watertight to provide selectively floating hull means when used for boating and floor and wall means when used for camping, and that includes an upper member removably supported on top of said base.

A further object is to provide such a camping and boating outfit in which said upper member includes a downwardly opening box-like and substantially horizontally disposed portion and a pair of leg portions pivotally attached to said horizontal portion and pivotable between a closed position under said horizontal portion and an open position in which said leg portions depend from the horizontal portion for use of the upper member as a table.

A further object is to provide such a camping and boating outfit in which said base is provided with upwardly opening sockets adjacent the corners thereof for respectively receiving the lower ends of the leg portions of said upper member when the leg portions are in an open position whereby the upper member is adapted to be used as a roof for said base as when the base is being used for boating.

A further object is to provide a plurality of depending resilient members attached to the bottom of said base and extending longitudinally of the base for selectively providing stabilizers when used for boating, for providing resilient supporting means for said base to engage the top of a car when being transported on the top of a car, and for providing sled means if it is desired to drag the base across the ground as when moving same from one place to another.

A further object is to provide such a camping and boating outfit which has a pair of cover panels respectively removably hingedly attached to the side panels of said base for movement between an overlapping stored disposition and a raised disposition with the cover panels being angularly arranged and being locked together whereby an angular cover for the base is provided.

A further object is to provide such cover panels which optionally may be moved to vertical positions to serve as side cover panels to enclose the side of the outfit of the present invention when used as a boat.

A further object is to provide such a camping and boating outfit in which unique locking means is provided for the cover panels.

A further object is to provide such a camping and boating outfit that is easily and quickly convertible from one form to another.

A further object is generally to improve the design and construction of camping and boating outfits.

The means by which the foregoing and other objects of the present invention are accomplished and the manner of their accomplishment will be readily understood from the following specification upon reference to the accompanying drawings, in which:

FIG. 1 is a side elevational view of the camping and boating outfit of the present invention shown being transported on the top of an automobile and with only a portion of the automobile being shown.

FIG. 2 is a perspective view of the upper member of the outfit showing in broken lines the folded position of the leg portions and showing one of the leg portions in an extended disposition.

FIG. 3 is a perspective view of the outfit of the present invention after being converted for use as a sleeper.

FIG. 4 is a sectional view of the outfit of the present invention taken as on the line IV—IV of FIG. 1.

FIG. 5 is an end elevational view of the outfit in the form shown in FIG. 3.

FIG. 6 is an enlarged fragmentary view of a portion of the form depicted in FIG. 5, showing the locking means of the cover panels.

FIG. 7 is an elevational view of the upper member of the present invention when used as a table.

FIG. 8 is a perspective view of the outfit of the present invention shown in a disposition for use as a boat.

FIG. 9 is an enlarged fragmentary perspective view showing one of the removable hinges on the cover panels and base, with the elements of the hinge being shown in a disengaged disposition.

FIG. 10 is a fragmentary sectional view taken as on the line X—X of FIG. 8.

Referring now to the drawings in which the various parts are indicated by numerals, the outfit 11 of the present invention comprises in general a base 13 and an upper member 15 removably supported on top of base 13 when the outfit 11 is in a compact or collapsed disposition for transporting, as shown in FIG. 1.

Base 13 includes a bottom panel 17, end panels 19, 21 attached to and extending upwardly from the opposite ends of bottom panel 17, and side panels 23, 25 attached to and extending upwardly from the opposite side edges of the bottom panel and interconnecting ends 19, 21 at the opposite ends thereof. Base 13 is preferably watertight and the panels 17, 19, 21, 23 and 25 are preferably integrally formed of any suitable material as plastic, fiberglass, aluminum, or the like. End panel 19 is preferably sloped or rounded as at 27 so that it serves as the bow when the base 13 is being used as a boat. Thus, base 13 selectively provides floating hull means when used for boating and floor and wall means when used for camping, as will be better understood in the description to follow later in the specification.

At each of the four corners of base 13 is provided a vertically extending and upwardly opening socket 29 for a purpose later to be described. A plurality of resilient members 31 (preferably four in number) which are formed from a suitable material as rubber or the like, are fixedly attached to the bottom of bottom panel 17 adjacent the four corners of base 13 and dependent downwardly. Resilient members 31 are respectively relatively narrow in width and are elongated longitudinally of base 13 so that they are useful as stabilizers when base 13 is used as a boat and for resilient supporting means to engage the top T of a car C, as best seen in FIG. 1 when being transported by the car. Also, members 31 are useful to slidably engage the ground if it is desired to pull base 13 across the ground as when moving it from one place to another. A plurality of handles 33 are attached to opposite sides of base 13 on side panels 23, 25 and not only serve as a means for handling base 13 but also serve as a means for removably attaching the base to the automobile. Thus, suitable strap means 35 extend between handles 33 and the automobile in a typical manner to removably hold the base 13 on the car C, as shown in FIG. 1.

Upper member 15 preferably comprises a downwardly opening box-like and substantially horizontally disposed portion 37 having a horizontal top panel 39, interconnected side portions 41, 43 and end portions 45, 47, depending from the edges of top panel 39. The horizontally disposed portion 37 is preferably integrally formed of suitable material as plastic, fiberglass, aluminum or the like. In addition, upper member 15 includes a pair of leg portions 49, 51 pivotally attached to horizontal portion 37 respectively adjacent end portions 45, 47 and pivotable between a closed position under top panel 39, as shown in FIG. 2, and an open position in which leg portions 49, 51 respectively extend vertically from horizontal portion 37, as seen in FIG. 7. Leg portions 49, 51 respectively comprise a pair of spaced apart legs 53, 55 and 57, 59. The legs 53, 55, 57, 59 are the parts hingedly attached by suitable means, not shown, to the horizontal portion 37. In addition, leg portions 49, 51 include cross members 61, 63 respectively extending between legs 53, 55 and between legs 57, 59 intermediate the ends of the legs.

The spacings between legs 53, 55, 57 and 59 are such that when the leg portions 49, 51 are moved into the heretofore-mentioned open position, the lower end portions of the legs below the cross members 61, 63 are slidably receivable in the sockets 29 provided in base 13 so that horizontal portion 37 serves as a roof for base 13, as when the outfit 11 is used as a boat, as shown in FIG. 8. Thus, sockets 29 and the lower end portions of the legs serve as interengaging means to engage leg portions 49, 51 with base 13. It will be seen that when in the above-described disposition, the cross members 61, 63 are resting respectively on the end panels 19, 21 to further strengthen the structure and serve as a stop for the depth of insertion of the legs. It will be understood that, if desired, an outboard motor, not shown, may be attached to base 13 to propel the device through the water.

When the upper member 15 is in the heretofore-described open position and is removed from base 13, it is adapted to be used as a table, as shown in FIG. 7, or as additional sleeping quarters, as required. Also, if desired, one of the leg portions 49 or 51 may be left in a closed position and the other in an open position, as shown in FIG. 2, so that upper member 15 can serve as a lean-to type of sleeping shelter. It will be understood that the upper member 15 is adapted to be in the folded disposition when the upper member is in place on base 13, as shown in FIG. 1. The dimensions of horizontal portion 37 of upper member 15 are such that when the upper member rests on top of base 13, as seen in FIG. 1, the side portions 41, 43 and end portions 45, 47 respectively rest on side panels 23, 25 and end panels 19, 21. Fastening means as at 65, of any suitable well-known type is provided for removably holding upper member 15 in place on base 13 when being transported, as shown in FIG. 1.

A pair of preferably substantially rigid and rectangular cover panels 67, 69 are provided in base 13. Cover panels 67, 69 respectively have proximal edges 71, 73 and distal edges 75, 77 in spaced parallel relationship to the proximal edges. Cover panels 67, 69 are respectively removably hingedly attached adjacent the proximal edges 71, 73 thereof to side panels 23, 25. The removable hinge means mentioned hereinabove is shown as at 79 and preferably includes a first hinge portion 81 attached to the associated cover panel 67 or 69 by suitable fastening means as the fasteners 82 and which hinge portion includes a horizontally projecting hinge pin 83 adapted to be removably and turnably received in a barrel portion 85 of the hinge portion 87 that is attached to the associated side panel 23 or 25 by suitable means as the fasteners 89. It will be understood that the hinge portions 81 and 87 can be disengaged, as shown in FIG. 9, by moving the cover panels 67, 69 lengthwise in the direction of the hinge pins 83 and can be re-engaged by substantially the opposite movement. Cover panels 67, 69 when hingedly attached to the base 13 are movable between an overlapping stored disposition, as seen in FIG. 4, as when upper member 15 is supported on base 13, and a raised disposition, as best shown in FIGS. 3 and 5, as when the upper member 15 is removed and the device is used as a shelter. When in said stored disposition, panel 67 preferably rests on panel 69 and panel 69 rests on a stop 90 provided in base 13 and attached to side panel 25. When in said raised disposition, the cover panels 67, 69 are angularly arranged with the distal edge 75 of cover panel 67 being adjacent the distal edge 77 of cover panel 69. In addition, means is provided for locking the cover panels 67, 69 in the above-mentioned angular arrangement. This locking means preferably comprises a groove 91 in cover panel 69 on the under surface thereof adjacent distal edge 77 for receiving the distal edge 75 of cover panel 67 in the manner shown in FIG. 6, and suitable holding means, as the strap 93 fixedly attached to panel 69 as by the brad 95 and removably attached to panel 67 as by the snap fastener 97. Also, if desired, cover panels 67, 69 may be respectively moved to vertical positions when the outfit is in the form of a boat as shown in FIG. 8 and held in such positions by suitable means, as snap fasteners, not shown, interacting between the distal edges of cover panels 67, 69 and the respective side portions 41, 43, so that the panels enclose the sides of the boat. Additionally, if desired, rectangular flaps, not shown, may be used to cover the ends of the boat and may be held in place by suitable means as snap fasteners or the like.

It will be understood that when the device is in the form shown in FIGS. 3 and 5, it can be left on top of the car C for sleeping or can be placed on the ground or other supporting surface for sleeping. In addition, the device is preferably large enough to sleep two persons comfortably in base 13. If desired, suitable triangular end flaps, not shown, may be removably attached across the ends of panels 67, 69 to close off the ends of the device. Also, it will be understood that, if desired, the base 13 may be left attached to top T, the upper member 15 removed therefrom, and the cover panels 67, 69 pivoted upwardly and outwardly to positions substantially 180° from that shown in FIG. 4 so that the cover panels act as a canopy over opposite sides of the car C. If desired, suitable stop means, not shown, may be provided for supporting the cover panels 67, 69 in the abovementioned outward canopy position, or, if desired, removable posts, not shown, may be provided. In addition, other uses may be made of the outfit of the present invention, as for example, base 13 with upper member 15 removed may be used as an additional dinghy for a yacht, and the device, when in the form shown in FIG. 1 may be used as a storage or baggage rack.

From the foregoing description, it will be understood that a very versatile and compact boating outfit is provided which provides for many of the needs in camping and boating. Further, such an outfit is provided which can be converted easily and quickly to the different forms thereof. In addition, such an outfit is provided which is lightweight and can be easily transported, either in the manner shown in FIG. 1 or simply placed on a boat trailer to be pulled by the car. Additionally, the unique arrangement of the present invention is very effective yet is simple in construction and economical to manufacture.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A camping and boating outfit comprising a base including a bottom panel, end panels attached to and extending upwardly from opposite ends of said bottom panel, side panels attached to and extending upwardly from opposite sides of said bottom panel and interconnecting said end panels adjacent opposite ends thereof; said base being watertight and for selectively providing floating hull means when used for boating and floor and wall means when used for camping; and an upper member removably supported on top of said base, said upper member including a substantially horizontally disposed portion and unfoldable leg portion means for selectively supporting said horizontally disposed portion in spaced relationship above said base, said unfoldable leg portion means including a pair of leg portions at opposite ends of said horizontally disposed portion, and means for securing said leg portions to said base when said horizontally disposed portion is supported in spaced relationship above said base.

2. The camping and boating outfit of claim 1 in which a plurality of depending resilient members are attached to the bottom of said base and extend longitudinally of said base for selectively providing stabilizers when used for boating, supporting means for said base to engage the top of a car when being transported on top of a car, and skid means when being moved across a supporting surface.

3. A camping and boating outfit comprising a base including a bottom panel, end panels attached to and extending upwardly from opposite ends of said bottom panel, and side panels attached to and extending upwardly from opposite sides of said bottom panel and interconnecting said end panels adjacent opposite ends thereof; said base being watertight and providing selectively floating hull means when used for boating and floor and wall means when used for camping; a plurality of depending resilient members attached to the bottom of said base and extending longitudinally of said base for selectively providing stabilizers when used for boating, supporting means for said boat to engage the top of a car when being transported on top of a car and skid means when being removed across a supporting surface; an upper member removably supported on top of said base and including a downwardly opening box-like and substantially horizontally disposed portion having a horizontal top panel, interconnected side and end portions depending from the edges of said top panel and a pair of leg portions pivotally attached to said box-like portion and pivotable between a closed position under said top panel and an open position in which said leg portions depend from said box-like portion for use of said upper member as a table, said leg portions respectively including a pair of legs and cross members respectively interconnecting said pair of legs intermediate the ends thereof, said base being provided with upwardly opening sockets adjacent the corners thereof for respectively receiving the lower ends of said legs when said leg portions are in an open position with said cross members resting on said end panels and with said top panel being spaced above said base whereby said upper member is adapted to be used as a roof for said base, a pair of cover panels, each having a proximal edge and a distal edge in spaced parallel relationship, said cover panels being respectively removably hingedly attached to said side panels along the proximal edges thereof and movable between an overlapping stored disposition as when said upper member is supported on said base, and a raised disposition as when said upper member is removed, when in said raised disposition, said cover panels being angularly arranged with the distal edge of one of said cover panels being adjacent the distal edge of the other of said cover panels whereby an angular cover for said base is provided, and means locking said cover panels in said angular arrangement.

4. A camping and boating outfit comprising a base including a bottom panel, end panels attached to and extending upwardly from opposite ends of said bottom panel, side panels attached to and extending upwardly from opposite sides of said bottom panel and interconnecting said end panels adjacent opposite ends thereof; said base being watertight and for selectively providing floating hull means when used for boating and floor and wall means when used for camping; and an upper member removably supported on top of said base, said upper member including a substantially horizontally disposed portion and unfoldable leg portion means for selectively supporting said horizontally disposed portion in spaced relationship above said base, said unfoldable leg portion means including a pair of leg portions at opposite ends of said horizontally disposed portion, each of said leg portions including a pair of legs and cross members respectively interconnecting said pair of legs intermediate the ends thereof; and said base being provided with upwardly opening sockets adjacent the corners thereof for respectively receiving the lower ends of said legs with said cross members resting on said end panels.

5. A camping and boating outfit comprising a base including a bottom panel, end panels attached to and extending upwardly from opposite ends of said bottom panel, side panels attached to and extending upwardly from opposite sides of said bottom panel and interconnecting said end panels adjacent opposite ends thereof; said base being watertight and for selectively providing floating hull means when used for boating and floor and wall means when used for camping; an upper member removably supported on top of said base, said upper member including a substantially horizontally disposed portion and unfoldable leg portion means for selectively supporting said horizontally disposed portion in spaced relationship above said base, and a pair of cover panels each having a proximal edge and a distal edge in spaced parallel relationship, said cover panels being respectively removably hingedly attached to said side panels along the proximal edges thereof and movable between an overlapping stored disposition as when said upper member is supported on said base and a raised disposition as when said upper member is removed; when in said raised disposition said cover panels being angularly arranged with the distal edge of one of said cover panels being adjacent the distal edge of the other of said cover panels whereby an angular cover for said base is provided, and means locking said cover panels in said angular arrangement.

6. A camping and boating outfit comprising a base including a bottom panel, end panels attached to and extending upwardly from opposite ends of said bottom panel, side panels attached to and extending upwardly from opposite sides of said bottom panel and interconnecting said end panels adjacent opposite ends thereof; said base being watertight and for selectively providing floating hull means when used for boating and floor and wall means when used for camping; an upper member removably supported on top of said base, said upper member including a substantially horizontally disposed portion and unfoldable leg portion means for selectively supporting said horizontally disposed portion in spaced relationship above said base, a pair of cover panels each having a proximal edge and a distal edge in spaced parallel relationship, said cover panels being respectively removably hingedly attached to said side panels along the proximal edges thereof and movable between an overlapping stored disposition as when said upper member is supported on said base and a raised disposition as when said upper member is removed; when in said raised disposition said cover panel being angularly arranged with the distal edge of one of said cover panels being adjacent the distal edge of the other of said cover panels whereby an angular cover for said base is provided, and means locking said cover panels in said angular arrangement, said locking means comprising means providing a groove in one of said cover panels adjacent the distal edge thereof for receiving the distal edge of the other of said cover panels, and means holding said cover panels in place.

7. A camping and boating outfit comprising a base including a bottom panel, end panels attached to and extending upwardly from opposite ends of said bottom panel, side panels attached to and extending upwardly from opposite sides of said bottom panel and interconnecting said end panels adjacent opposite ends thereof; said base being watertight and for selectively providing floating hull means when used for boating and floor and wall means when used for camping, a pair of cover panels each having a proximal edge and a distal edge in spaced parallel relationship, said cover panels being respectively removably hingedly attached to said side panels along the proximal edges thereof and movable between an overlapping stored disposition and a raised position; when in said raised disposition said cover panels being angularly arranged with the distal edge of one of said cover panels being adjacent the distal edge of the other of said cover panels whereby an angular cover for said base is provided, and means locking said cover panels in said angular arrangement.

References Cited

UNITED STATES PATENTS 2,412,162 12/1946 Lindblom  91—1
3,004,678 10/1961 Golaski  224—42.01

FERGUS S. MIDDLETON, *Primary Examiner.*

MILTON BUCHLER, *Examiner.*

T. M. BLIX, *Assistant Examiner.*